(12) United States Patent
Ahluwalia et al.

(10) Patent No.: US 9,002,365 B2
(45) Date of Patent: Apr. 7, 2015

(54) COMMUNICATIONS SYSTEM

(75) Inventors: Jagdeep Singh Ahluwalia, Sutton (GB); Francesca Serravalle, Surrey (GB)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 1066 days.

(21) Appl. No.: 12/734,147

(22) PCT Filed: Oct. 27, 2008

(86) PCT No.: PCT/JP2008/069832
§ 371 (c)(1),
(2), (4) Date: Apr. 14, 2010

(87) PCT Pub. No.: WO2009/057729
PCT Pub. Date: May 7, 2009

(65) Prior Publication Data
US 2010/0285802 A1  Nov. 11, 2010

(30) Foreign Application Priority Data

Oct. 29, 2007 (GB) ................... 0721155.0

(51) Int. Cl.
*H04W 72/00* (2009.01)
*H04W 36/00* (2009.01)
*H04W 36/30* (2009.01)
*H04W 92/02* (2009.01)
*H04B 17/00* (2006.01)

(52) U.S. Cl.
CPC .......... *H04W 36/0083* (2013.01); *H04W 36/30* (2013.01); *H04W 92/02* (2013.01); *H04B 17/0077* (2013.01)

(58) Field of Classification Search
CPC ...... H04W 36/00; H04W 36/30; H04W 92/02
USPC ........... 455/436, 561, 522; 370/252, 330, 338
See application file for complete search history.

(56) References Cited

U.S. PATENT DOCUMENTS 5,966,657 A  10/1999 Sporre
7,120,437 B2  10/2006 Benson et al.
(Continued)

FOREIGN PATENT DOCUMENTS

CN   1750700 A   3/2006
EP   1 677 557 A1  7/2006
(Continued)

OTHER PUBLICATIONS

"Technical Specification 3rd Generation Partnership Project: Technical Specification Group Radio Access Network; Radio Access Network; Radio Resource Control (RRC); Protocol Specification (Release 7)," 3rd Generation Partnership Project (3GPP); Technical Specification (TS), No. 3GPP TS 25.331 V.7.3.0, Dec. 1, 2006, pp. 221-223.

(Continued)

*Primary Examiner* — Shahriar Behnamian

(57) ABSTRACT

A mobile communications system is proposed in which mobile communications devices are arranged to carry out signal measurements on the signals received from neighboring cells. The bandwidth over which these signal measurements are carried out is determined in dependence upon the bandwidths of the neighboring cells and is signalled to the mobile communication device by a serving base station.

33 Claims, 8 Drawing Sheets

(56) References Cited

U.S. PATENT DOCUMENTS

| | | |
|---|---|---|
| 8,249,007 B2* | 8/2012 | Jading et al. .................. 370/329 |
| 8,706,151 B2* | 4/2014 | Ishii ............................... 455/522 |
| 2002/0147020 A1* | 10/2002 | Iguchi et al. .................. 455/452 |
| 2003/0032433 A1 | 2/2003 | Daniel et al. |
| 2005/0233752 A1* | 10/2005 | Laroia et al. .................. 455/450 |
| 2009/0042532 A1* | 2/2009 | Bienas et al. ................. 455/403 |
| 2009/0147748 A1* | 6/2009 | Ofuji et al. .................... 370/330 |
| 2009/0262654 A1 | 10/2009 | Iwamura et al. |
| 2009/0275356 A1* | 11/2009 | Chapman et al. ............. 455/522 |
| 2010/0003979 A1* | 1/2010 | Iwamura et al. .............. 455/436 |

FOREIGN PATENT DOCUMENTS

| | | |
|---|---|---|
| GB | 2344972 A | 6/2000 |
| GB | 2376605 A | 12/2002 |
| GB | 2385745 A | 8/2003 |
| WO | WO 03/013175 A2 | 2/2003 |
| WO | WO 2007/052722 A1 | 5/2007 |
| WO | WO 2007/111185 A1 * | 10/2007 .................... 455/436 |

OTHER PUBLICATIONS

Nokia et al., "R4-071329 RSSI Measurement Bandwidth," Aug. 16, 2007, pp. 1-3.
Motorola: "E-UTRA Measurement Related to Mobility," 3GPP TSG RAN WR1 Meeting #47BIS, No. R1-070044, Jan. 15, 2007, pp. 1-4.
Chinese Office Action dated Dec. 5, 2012 with English translation thereof.
Nokia, et al.,"Potential applications of RSSI measurement quality in E-UTRA", 3GPP TSG-RAN4#43bis Meeting, R4-070924, Jun. 25-29, 2007.
AT&T/Cingular,"Additional Link Level Simulation Results for Type 3 and Type 3i Receivers",3GPP TSG RAN WG4 Meeting #42, R4-070044, Feb. 12-16, 2007, pp. 1-4.
Nokia et al.,"R4-071329 RSSI Measurement Bandwidth", Aug. 16, 2007, pp. 1-3. (Previously Submitted).

* cited by examiner

COMMUNICATIONS SYSTEM

TECHNICAL FIELD

The present invention relates to mobile telecommunication networks, particularly but not exclusively networks operating according to the 3GPP standards or equivalents or derivatives thereof.

BACKGROUND ART

In mobile telecommunication networks, when User Equipment (UE) is connected to the network (RRC_CONNECTED state) it can be configured to receive and/or transmit data in discontinuous time periods, the duration and frequency of which are controlled by the base station (eNodeB). This discontinuous reception/transmission is called DRX/DTX and allows the UE to turn off its transceiver circuitry during the periods when it is not supposed to receive and/or transmit data from the base station, thereby reducing power consumption. Additionally, during periods that the UE is not scheduled to receive data, it is also required to perform some signal strength measurements to assist the network in making inter frequency handovers (for example between cells operating at different frequencies) or inter network (RAT) handovers (for example from UMTS to GSM). The current working assumption in RAN1 is that the measurement bandwidth of the UE for these measurements will be 1.25 MHz (corresponding to 6 resource blocks), regardless of the bandwidth of the neighbouring cells.

DISCLOSURE OF THE INVENTION

The present invention aims to provide an alternative arrangement for UEs so that more efficient measurements over the bandwidth can be made.

According to one aspect, the present invention provides a method performed by a communication device of a communication network, the method comprising: determining cell bandwidths of neighbouring cells; processing the cell bandwidths to determine a measurement bandwidth for a mobile communications device; and signalling the determined measurement bandwidth to the mobile communications device.

The processing step may process the cell bandwidths to determine the smallest cell bandwidth and may then determine the measurement bandwidth for the mobile communications device using the smallest cell bandwidth. When considering the measurement bandwidth, the method also considers the bandwidth of a serving cell.

The method may also comprise receiving a cell ID (Identification Data) for a new neighbouring cell; establishing a connection with the base station corresponding to the new cell; and receiving from the base station cell bandwidth information for the new neighbouring cell. The cell ID for a new cell may be received from a mobile communications device.

Another aspect of the invention provides a method performed in a mobile communications device, the method comprising: receiving signalling information from an associated communications device, the signalling information identifying a measurement bandwidth; detecting neighbouring cells; and performing measurements on the signals from the neighbouring cells over the bandwidth identified by the signalling information. The received signalling information may define a reconfiguration of the measurement bandwidth for the mobile communications device. Preferably the measurements are obtained between transmitting or receiving user data to or from the associated communications device.

The mobile communications device can also notifying the associated communications device of the neighbouring cells from which signals have been received. In this case, the step of receiving signalling information may be performed after the notifying step.

The invention provides, for all methods disclosed, corresponding computer programs or computer program products for execution on corresponding equipment, the equipment itself (user equipment, nodes or components thereof) and methods of updating the equipment.

BRIEF DESCRIPTION OF THE DRAWINGS

An embodiment of the invention will now be described, by way of example, with reference to the accompanying drawings in which.

BEST MODE FOR CARRYING OUT THE INVENTION

Overview

Figure 1:
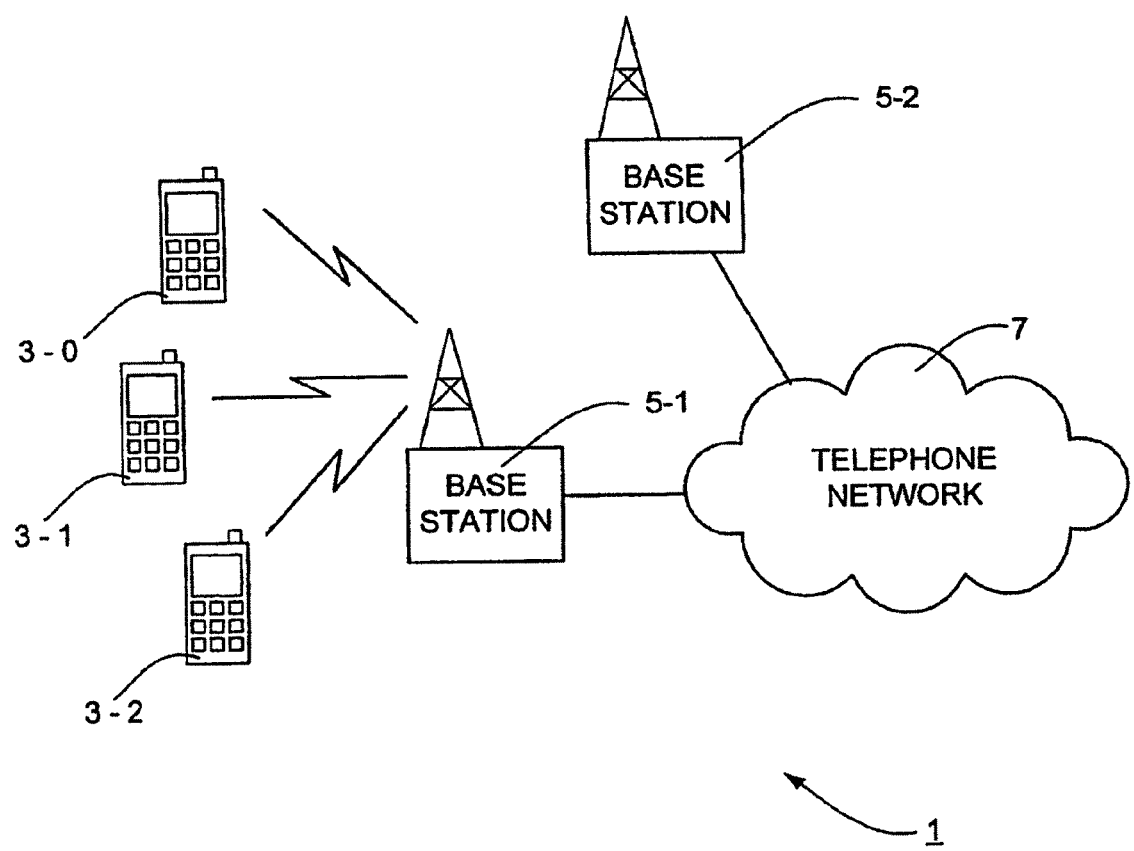
FIG. 1 schematically illustrates a mobile telecommunication system of a type to which the embodiment is applicable.

FIG. 1 schematically illustrates a mobile (cellular) telecommunication system 1 in which users of mobile telephones (MT) 3-0, 3-1, and 3-2 can communicate with other users (not shown) via one of the base stations 5-1 or 5-2 and a telephone network 7. A number of uplink and downlink communications resources (sub-carriers, time slots etc) are available for the wireless link between the mobile telephones 3 and the base stations 5. In this embodiment, the base stations 5 allocate downlink resources to each mobile telephone 3 depending on the amount of data to be sent to the mobile telephone 3. Similarly, the base stations 5 allocate uplink resources to each mobile telephone 3 depending on the amount and type of data the mobile telephone 3 has to send to the base station 5.

To help the mobile telephones 3 conserve power, each mobile telephone 3 is configured in advance and/or by the base station 5 to receive and transmit its data only during predetermined periods defined by a DRX/DTX pattern. In between those periods, the mobile telephone 3 can power down its transceiver circuitry to conserve battery power or it can make appropriate inter frequency/RAT measurements, i.e. make signal measurements on signals received from neighbouring cells.

Base Station

Figure 2:
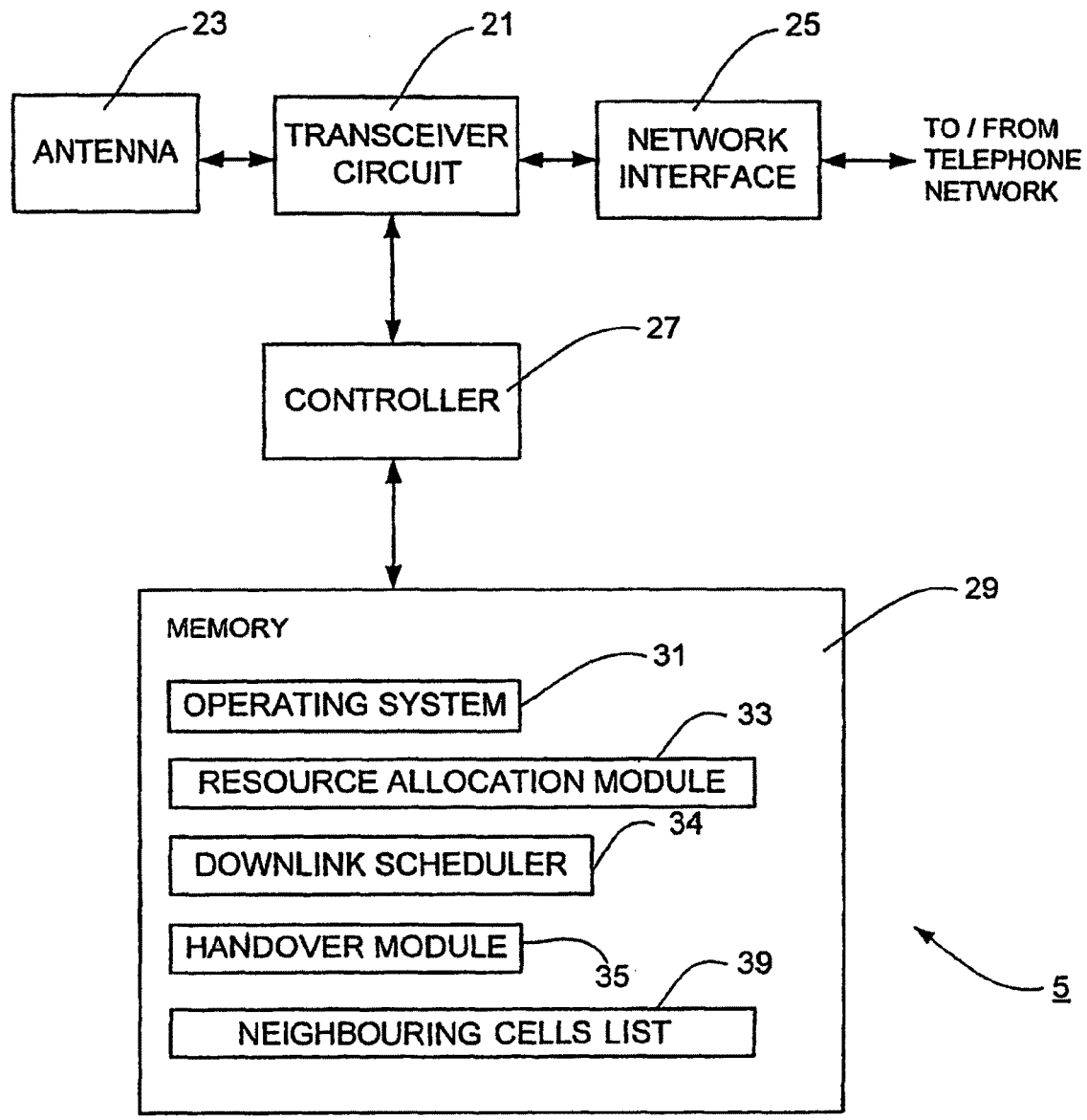
FIG. 2 schematically illustrates a base station forming part of the system shown in FIG. 1.

FIG. 2 is a block diagram illustrating the main components of each of the base stations 5 used in this embodiment. As shown, each base station 5 includes a transceiver circuit 21 which is operable to transmit signals to and to receive signals from the mobile telephones 3 via one or more antennae 23 and which is operable to transmit signals to and to receive signals from the telephone network 7 via a network interface 25. A controller 27 controls the operation of the transceiver circuit 21 in accordance with software stored in a memory 29. The software includes, among other things, an operating system 31, a resource allocation module 33 and a downlink scheduler 34. The resource allocation module 33 is operable to allocate the above described communications resources for the uplink and downlink communications to each mobile telephone 3 and the downlink scheduler 34 schedules the transmission of downlink data to each mobile telephone 3 and the uplink transmission opportunities for each mobile telephone 5 based on the allocated resources. The base station 5 also has a neighbouring cells list 39 which includes cell information about neighbouring cells, such as their L1 and L3 cell IDs.

Mobile Telephone

Figure 3:
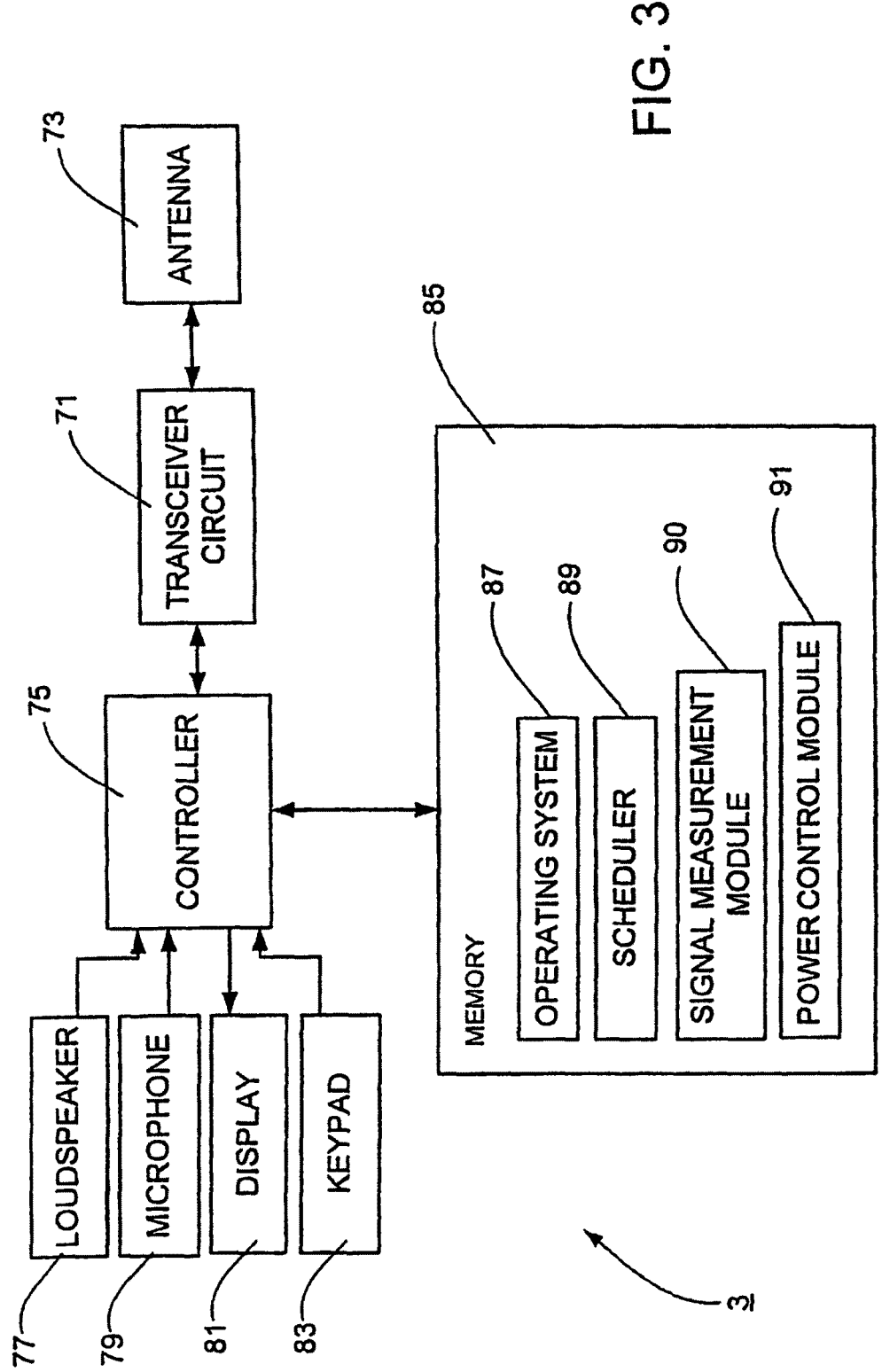
FIG. 3 schematically illustrates a mobile communication device forming part of the system shown in FIG. 1.

FIG. 3 is a block diagram illustrating the main components of each of the mobile telephones 3 shown in FIG. 1. As shown, the mobile telephones 3 include a transceiver circuit 71 that is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87, an uplink scheduler 89, a signal measurement module 90 and a power control module 91. The uplink scheduler 89 is responsible for scheduling the transmission of uplink data in accordance with the resources allocated to the mobile telephone 3 for its uplink transmissions by the base station 5; the signal measurement module 90 is responsible for making inter-frequency and inter-RAT signal measurements for the base station 5; and the power control module is responsible for powering down the transceiver circuit 71 during the DRX/DTX off periods.

In the above description, the base station 5 and the mobile telephones 3 are described for ease of understanding as having a number of discrete modules (such as the resource allocation, scheduler, power control and signal measurement modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Protocols

Figure 4:
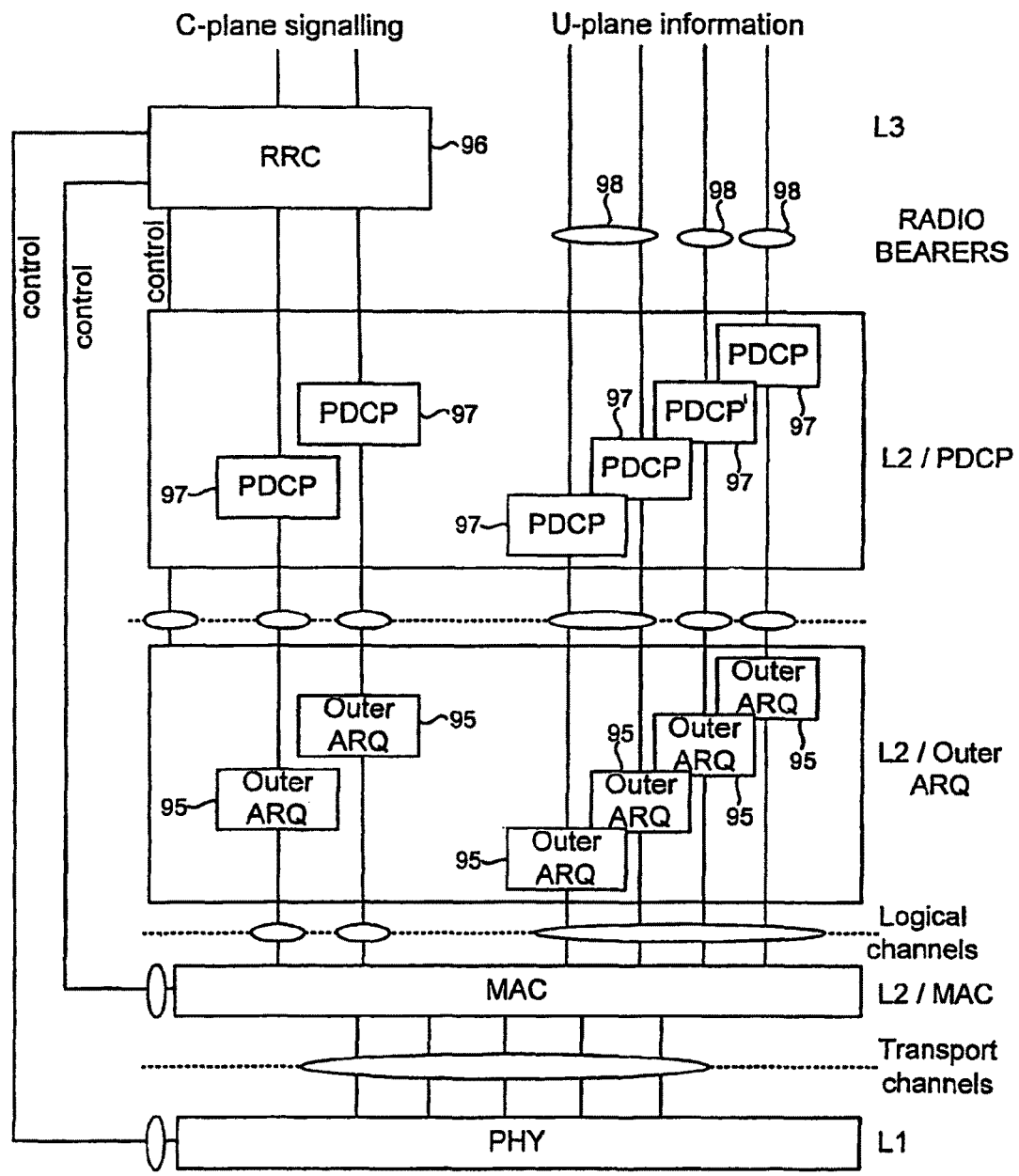
FIG. 4 illustrates three layers of a protocol stack used in the mobile communication device and the base station shown in FIG. 1.

FIG. 4 illustrates part of a protocol stack (lower three layers) used in the mobile telephones 3 and the base stations 5. The first layer is the physical layer (L1) which is responsible for the actual transmission of the data over the radio communication channel. Above that is the second layer (L2), which is divided into three sub-layers—the Medium Access Control layer (L2/MAC) which is responsible for controlling access to the air interface; the Outer ARQ layer (L2/Outer-ARQ) which is responsible for concatenation and segmentation of data packets, the acknowledgment of packets and the re-transmission of data packets where necessary; and the PDCP layer (L2/PDCP) which is responsible for header compression and ciphering. Above the second layer is the Radio Resource Control (RRC) layer (L3/RRC) that is responsible for controlling radio resources used in the air interface between the base station 5 and the mobile telephone 3. As shown, the L2/Outer ARQ layer includes a number of Outer ARQ entities 95 used to manage the transmission of C-plane data and U-plane data and the L2/PDCP layer includes PDCP entities 97 used to process the C-plane and the U-plane data.

FIG. 4 also shows the radio bearers 98 assigned to each source of data to be transmitted. Several software applications may be operating at the same time and each application may be sending and/or receiving data. A respective radio bearer would be associated with each task and some radio bearers are assigned higher priority than others. For example, radio bearers assigned to real time services will be assigned higher priority than those assigned to non-real time services. The communication resources allocated by the base station 5 for the uplink are shared between the radio bearers 98, depending on their assigned priorities and data rates. The RRC layer 96 sets the data rate and priority for each radio bearer 98. The uplink scheduler 89 then controls the scheduling of the data packets of each radio bearer 98 for transmission based on the data rates and priorities assigned to the radio bearers by the RRC layer 96.

UE Measurement Bandwidth

As discussed above, the Current working assumption in RAN1 is that the mobile telephone's measurement bandwidth is 1.25 MHz (corresponding to 6 resource blocks) for performing the intra frequency measurements. Thus the mobile telephone 3 would, in all cases, measure the default bandwidth of 1.25 MHz, irrespective of the bandwidth of the neighbouring cells. In this application, the inventors propose utilising wider measurement bandwidths whenever possible and the associated signalling necessary to achieve this will be discussed below. More specifically, in the present embodiment, the mobile telephone 3 is arranged to perform the measurements over the largest possible bandwidth, which is the smallest bandwidth of the neighboring cells (including the serving cell) for which measurements are being made.

Figure 5A:
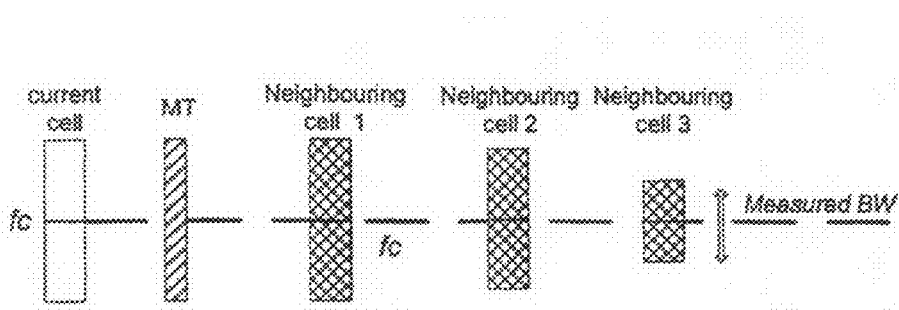
FIGS. 5a and 5b illustrate two scenarios of measurement bandwidth allocation.
Figure 5B:
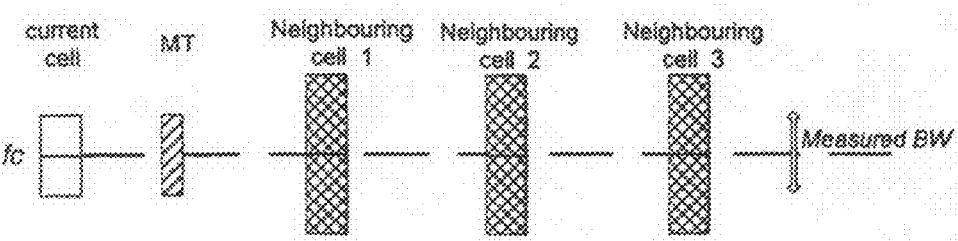

FIG. 5 illustrates two scenarios:
1) the scenario of FIG. 5a, where the three neighboring cells have different bandwidths and the mobile telephone's measurement bandwidth corresponds to that of the cell with the smallest bandwidth; and
2) the scenario of FIG. 5b, where all the neighboring cells have the same bandwidth, which is larger than the serving cell and in which the mobile telephone 3 performs measurements over the bandwidth of the serving cell (being the smallest bandwidth of all the cells being monitored).

Signalling Mechanism

In this embodiment, the serving base station 5 signals the measurement bandwidth that the mobile telephone 3 should use when making its measurements. It does this using an RRC Measurement Control message. To be able to do this, the serving base station 5 has to know the cell bandwidth of all the neighbouring cells and in this embodiment, this information is stored within the neighbouring cells list 39.

The initial information in the neighbouring cells list 39 will typically be provided by an operations and management (O&M) function of the network. However, the neighbouring cells will change from time to time as new cells are added or as old cells are removed. These cell changes can be identified by a base station 5 using the Automatic Neighbour Relation (ANR) procedure in response to the new cells being identified by the mobile telephones 3 it is serving. For example, a measurement report received from one of the mobile telephone 3 may identify a new cell (i.e. one not recognised by the base station and so not appearing in its neighbouring cells list 39). If it does, then the base station 5 of the serving cell will detect that there is a new cell reported by the mobile telephone 3. In response, the base station 5 orders the mobile telephone 3 to report the L3 (broadcast) cell ID of the new cell. Once this has been obtained, the base station 5 uses the received L3 cell ID to look up a transport layer address (e.g. IP address) for the base station 5 of the new cell. The serving base station then sets up a new X2 interface towards this base station (if one is not already available). Once the X2 interface has been setup, this base station sends the following information to the serving base station for each of the cells it controls over the newly setup X2 interface:

1) Layer 1 cell ID
2) Layer 3 cell ID
3) Measurement bandwidth

Figure 6:
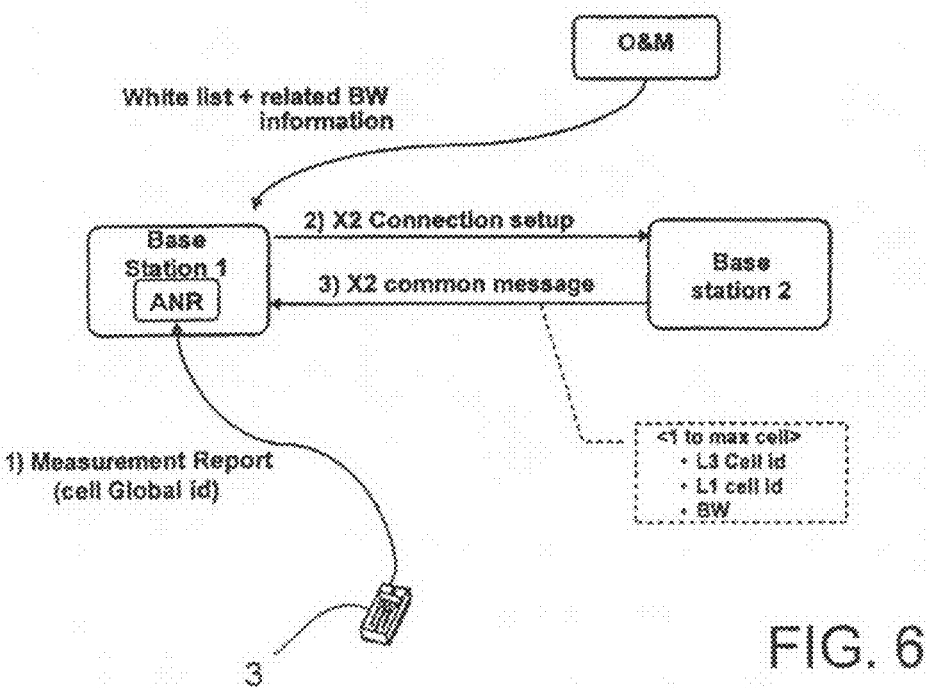
FIG. 6 illustrates an Automatic Neighbour Relation (ANR) process for finding out the cell bandwidths of new neighbouring cells.

The serving base station 5 then updates its neighbouring cell list 39 with the new detected cell and will store the Layer 1, Layer 3 and Measurement Bandwidth information related to the other cells controlled by the same node for future use. This process is illustrated diagrammatically in FIG. 6, where base station 1 is the serving base station and base station 2 is the base station controlling the new cell detected by the mobile telephone 3.

Thus, at the end of this process, the neighbouring cells list 39 will contain the following information shown in Table 1:

TABLE 1

| Base station (i) | | | Base station (j) | | |
|---|---|---|---|---|---|
| Layer 1 cell ID | Layer 3 cell ID = 1 | BW1 | Layer 1 cell ID | Layer 3 cell ID = 4 | BW4 |
| Layer 1 cell ID | Layer 3 cell ID = 2 | BW2 | Layer 1 cell ID | Layer 3 cell ID = 5 | BW5 |
| Layer 1 cell ID | Layer 3 cell ID = 3 | BW3 | Layer 1 cell ID | Layer 3 cell ID = 6 | BW6 |

The serving base station 5 then uses the bandwidth information in the neighbouring cells list 39 to determine the maximum measurement bandwidth the mobile telephones 3 it is serving, should measure. This information is then signalled to mobile telephone 3 in the Measurement Control Message for which intra frequency measurements are subsequently set up. As those skilled in the art will appreciate, when a new cell is identified and its bandwidth added to the neighbouring cells list 39, this may result in the base station 5 reconfiguring the measurement bandwidth of the mobile telephones 3 it serves. In this way, the base stations 5 dynamically define the measurement bandwidths of the mobile telephones 3 they serve.

White List

The neighbouring cells information 39 will include a white list and a black list. The cells that are available for the mobile telephones 3 to roam towards, are on the white list, whilst those that are not available or which are not recognised by the network are on the black list. When determining the measurement bandwidth to be used by the mobile telephones 3, the base station 5 will do so based on the known bandwidths of the cells in the white list only.

Figure 7:
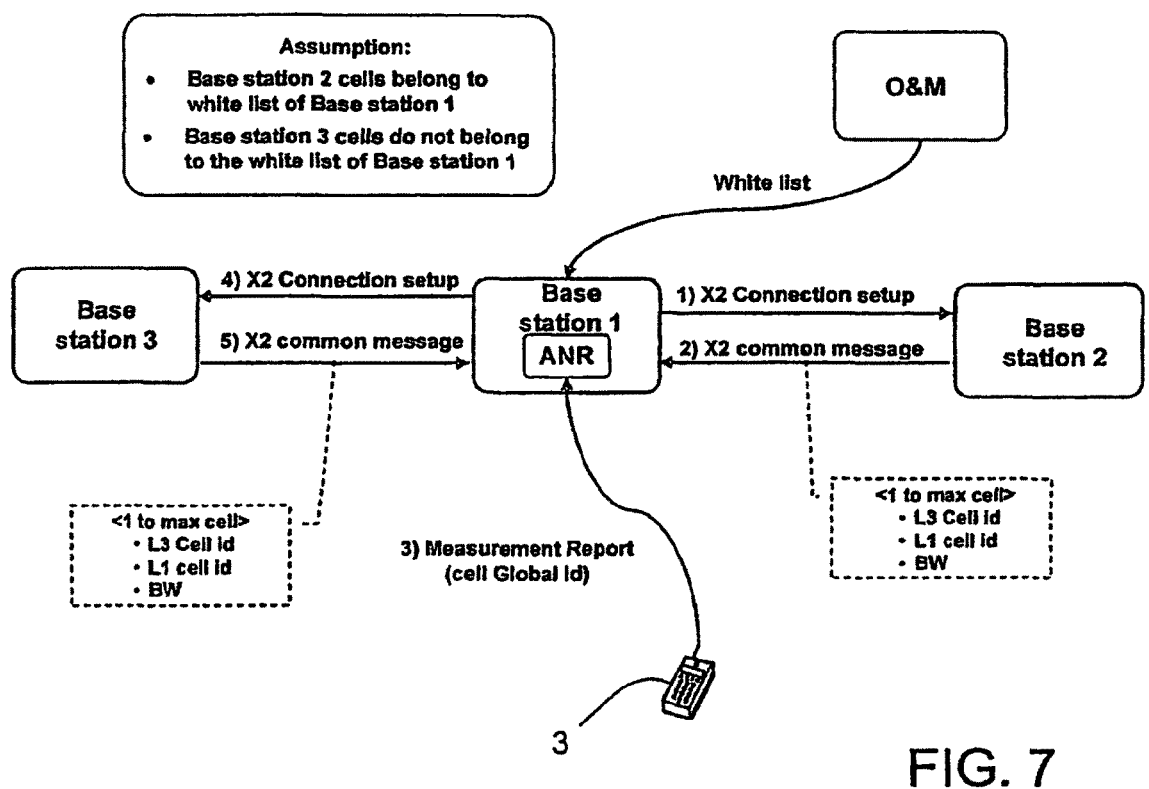
FIG. 7 illustrates the way in which the ANR procedure can discover cell bandwidth information from known cells.

As those skilled in the art will appreciate, where the Operations and Management function does not provide the bandwidth information at the initial setup, the base station 5 can find out this information through an X2 common message and updates its database with the bandwidth information received. (This is normal signalling to update only the BW info, and does not invoke ANR function.) This process is illustrated in FIG. 7. Subsequently, if a new cell (belonging to base station 3) is detected by mobile telephone 3, then base station 1 can seek to obtain and add cell information for the cells controlled by base station 3 using ANR function.

One of the advantages of this arrangement is that the base station 5 will already have the mapping between the layer 1 cell ID and the Layer 3 cell ID when the mobile telephone 3 sends a report for other cells belonging to the same base station 5. Hence the mobile telephone 3 does not need to read the BCH of a new cell belonging to a known base station. Another advantage is that all the information about all the cells of a base station 5 can be provided within one X2 common message.

Modifications and Alternatives

A detailed embodiment has been described above. As those skilled in the art will appreciate, a number of modifications and alternatives can be made to the above embodiment whilst still benefiting from the inventions embodied therein. By way of illustration only a number of these alternatives and modifications will now be described.

In the above embodiment, a mobile telephone based telecommunications system was described. As those skilled in the art will appreciate, the signalling and handover techniques described in the present application can be employed in any communications system. In particular, many of these handover techniques can be used in wire or wireless based communications systems which either use electromagnetic signals or acoustic signals to carry the data. In the general case, the base stations and the mobile telephones can be considered as communications nodes or devices which communicate with each other. In intra eNodeB handover, the source and target communications nodes will be formed by respective scheduling entities within one base station. Other communications nodes or devices may include user devices such as, for example, personal digital assistants, laptop computers, web browsers, etc.

In the above embodiments, a number of software modules were described. As those skilled will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities.

Various other modifications will be apparent to those skilled in the art and will not be described in further detail here.

Glossary of 3GPP Terms

LTE—Long Term Evolution (of UTRAN)
eNodeB—E-UTRAN Node B
UE—User Equipment—mobile communication device
DL—downlink—link from base to mobile
UL—uplink—link from mobile to base
MME—Mobility Management Entity
UPE—User Plane Entity
HO—Handover
RLC—Radio Link Control
RRC—Radio Resource Control
RRM—Radio Resource Management
SAE—System Architecture Evolution
C-RNTI—Cell-Radio Network Temporary Identifier
SIB—System Information Block
U-plane—User Plane
X2 Interface—Interface between two eNodeB S1 Interface—Interface between eNodeB and MME
TA—Tracking Area
EPC—Evolved Packet Core
AS—Access Stratum
RNL—Radio Network Layer
TNL—Transport Network Layer
RACH—Random Access Channel
MU MIMO—Multi-User Multi Input Multi Output
DMRS—Demodulation Reference Signal Format
MCS—Modulation and Coding Scheme The following is a detailed description of the way in which the present inventions may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

Introduction

Current working assumption in RAN1 is that the measurement bandwidth on 1.25 MHz (6RB) will be used for the performing the intra frequency measurements. However we believe that it would be beneficial if the UE can perform the measurement on the largest possible BW (say 10 Mz), if the entire neighbors cell have a BW of >=10 MHz instead of using default BW of 1.25 MHz.

In this contribution we discuss about mechanism involved in determining the largest possible BW on which the UE can perform RSRP and RSSI measurement on the neighbour cells.

Discussion

Based on the current assumption of RAN 1, UE in all cases would measure the default BW of 1.25 MHz, irrespective of the BW of the neighbouring cells. In this contribution we suggest utilizing wider measurement bandwidth whenever possible and discuss the associated signalling.

Figure 8:
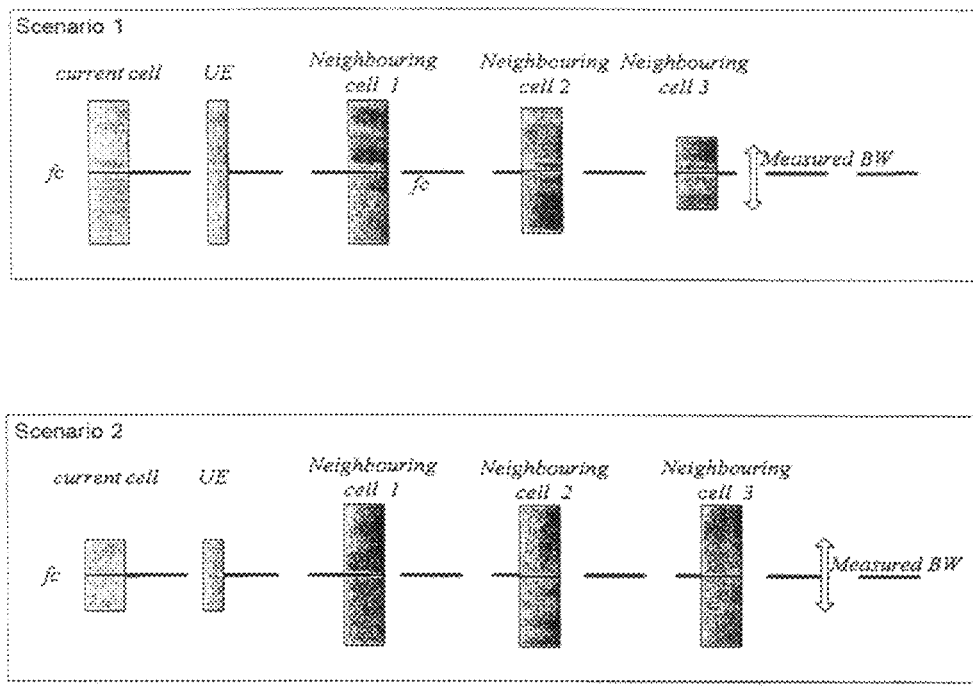
FIG. 8 illustrates two scenarios of measurement bandwidth.

Scenario 1 of FIG. 8 depicts the case where the three Neighbouring cells having different BW are shown. The UE should perform measurements on the smallest BW among the neighbouring cell. In scenario 2, all Neighbouring cell have the same BW of say 20 MHz and but the serving cell BW is say 10 Mz, then the UE should perform measurements on 10 MHz BW in order to compare the neighbouring cell signal strength with respect to the serving cell.

4.1. Signalling Mechanism

In order to signal the measurement BW to the UE using RRC Measurement Control message it is proposed that the eNB maintains for each cell in the neighbouring cell list, its related Cell Bandwidth information.

Figure 9:
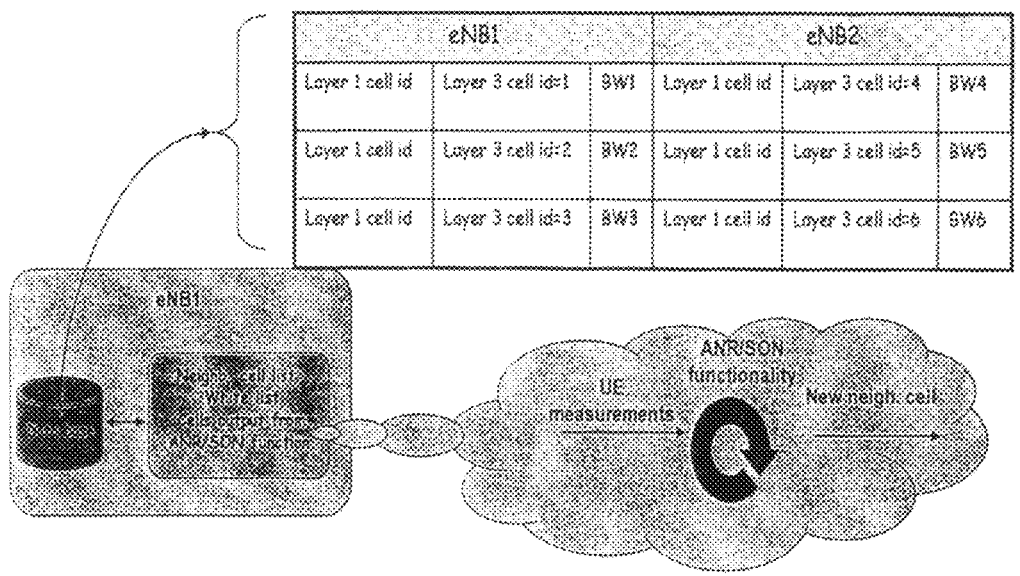
FIG. 9 an illustration for explaining the signalling mechanism.
Figure 10:
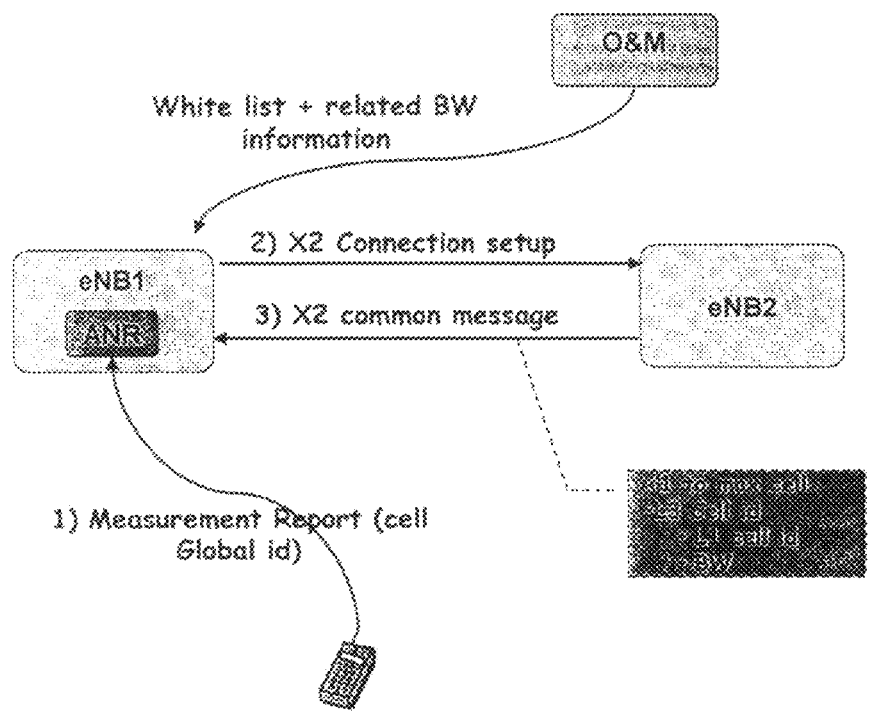
FIG. 10 an illustration for explaining the Automatic Neighbour Relation process of another example.
Figure 11:
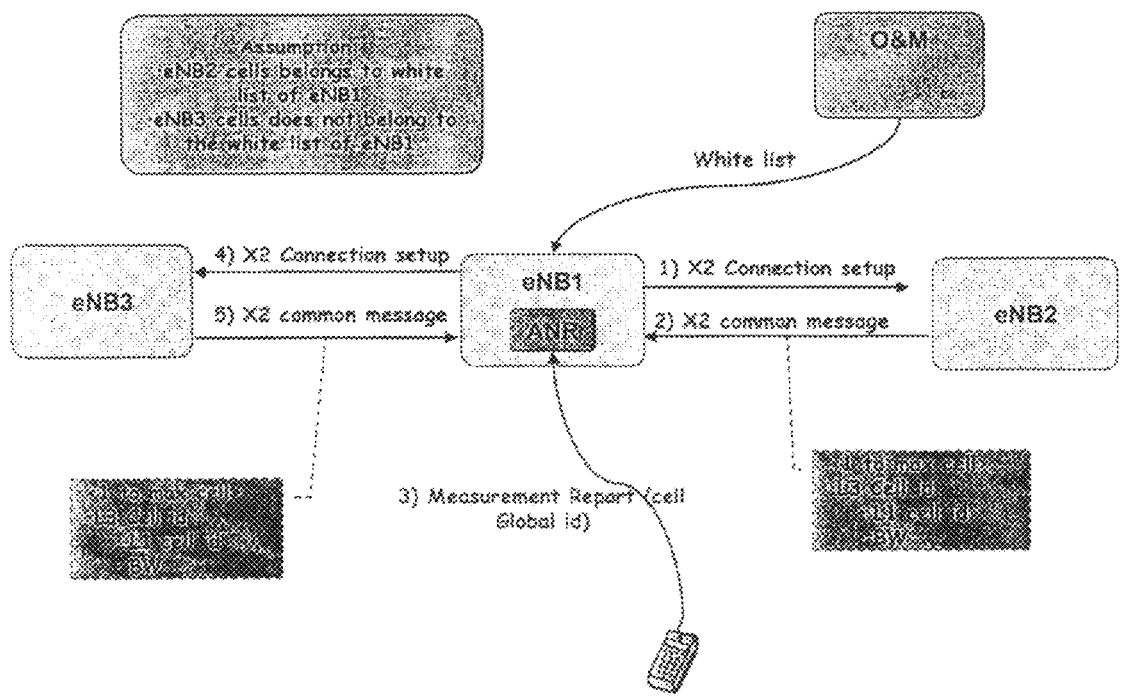
FIG. 11 an illustration for explaining the Automatic Neighbour Relation process of other example.

See in FIG. 9 an overview of the mechanism:

For the cells in the white list, eNB gets measurement bandwidth related information either by O&M (FIG. 10) or via X2 by the neighbouring eNBs, once the X2 connection is setup (FIG. 11).

For the cells newly added by ANR (Automatic Neighbour Relation) function, measurement bandwidth information is get via X2 Common message.

Using this mechanism, eNB can utilize the neighboring cell BW information to determine the maximum measurement BW the UE should measure. Measurement BW can then be signaled in the Measurement Control Message while setting up intra frequency measurements. The ANR mechanism is described in [R3-071819]. A summary of the mechanism is reported below:

1. The UE sends a measurement report for the signal strength of the detected cells. This report contain detected cell's Layer 1 identifier.

2. If the serving cells eNB detects that there is a new cell reported as a neighbor by the UE, it shall
   a. order the UE to report the L3 cell ID
   b. Lookup a transport layer address to the new eNodeB using L3 cell ID.
   c. If needed, setup a new X2 interface towards this eNodeB
   d. Update its Neighbor Relation List.

This mechanism also optimizes the ANR mechanism, as follow:

Once the x2 connection is setup towards a certain eNB due to the ANR function, the new neighbor eNB sends the following information related to the cells it controls over the newly setup X2 interface:
Layer 1 cell ID
Layer 3 cell ID
Measurement bandwidth As a consequence:

The eNB has already the mapping layer 1 cell ID-layer 3 cell ID when UE sends a measurement report for other cells belonging to the same eNB. Hence the UE does not read the BCH in this case.

Only one X2 common message per eNB is needed.

Conclusion

In this contribution we propose a simple mechanism involved in determining the largest possible BW on which the UE can perform RSRP and RSSI measurement on the neighbour cells. RSSI measurements would definitely benefit from wider bandwidth, however benefits for RSRP measurements needs to be studied further.

It is proposed to discuss the mechanism and to update the stage 2/stage 3 specification accordingly.

This application is based upon and claims the benefit of priority from United Kingdom Patent Application No. 0721155.0, filed on Oct. 29, 2007, the disclosure of which is incorporated herein in its entirety by reference.

The invention claimed is:

1. A method performed by a base station of a communication network, the method comprising:
   obtaining cell bandwidths of neighbouring cells;
   determining a smallest bandwidth from amongst the obtained cell bandwidths; and
   signalling a measurement bandwidth to a mobile communications device in dependence upon the determined smallest bandwidth.

2. A method according to claim 1, wherein said obtaining includes the cell bandwidth of a serving cell associated with the mobile communications device.

3. A method according to claim 1, wherein said obtaining comprises reading the cell bandwidths from a stored data structure.

4. A method according to claim 1, further comprising receiving measurement reports from the mobile communications device over the determined measurement bandwidth.

5. A method according to claim 1, further comprising:
   receiving a cell ID for a new neighbouring cell;
   establishing a connection with a base station corresponding to the new neighbouring cell; and
   receiving from the base station cell bandwidth information for the new neighbouring cell.

6. A method according to claim 5, wherein said receiving the cell ID for the new neighbouring cell receives said cell ID from said mobile communications device.

7. A method according to claim 5, further comprising storing the received cell bandwidth information in a data store of the communications device.

8. A non-transitory computer implementable instructions product comprising computer implementable instructions for causing a programmable computer device to perform the method of claim 1.

9. A method performed in a mobile communications device, the method comprising:
receiving signalling information from an associated communications device, the signalling information identifying a measurement bandwidth determined using at least one of a smallest bandwidth of neighbouring cells and a bandwidth of a cell serving the mobile communications device;
detecting neighbouring cells; and
performing measurements on the signals from the neighbouring cells over the bandwidth identified by the signalling information.

10. A method according to claim 9, wherein said received signalling information is received in a Measurement Control Message.

11. A method according to claim 9, wherein said performing performs said measurements between transmitting or receiving data to or from said associated communications device.

12. A method according to claim 9, wherein said detecting comprises receiving signals from the neighbouring cells.

13. A method according to claim 12, further comprising notifying the associated communications device of the neighbouring cells from which signals have been received.

14. A method according to claim 13, wherein said receiving signalling information is performed after said notifying.

15. A method according to claim 9, wherein said receiving receives signalling information identifying a measurement bandwidth that differs from the bandwidth of the associated communications device, and further wherein said performing performs measurements on signals from the associated communications device over the bandwidth identified by the signalling information.

16. A method according to claim 9, wherein said receiving receives signalling information identifying a measurement bandwidth that corresponds to a smallest cell bandwidth determined by the associated communications device.

17. A method according to claim 9, wherein the measurement bandwidth is determined using the smallest bandwidth of neighboring cells and the bandwidth of the cell serving the mobile communication s device.

18. A base station, comprising:
means for obtaining cell bandwidths of neighbouring cells;
means for deteimining a smallest bandwidth from amongst the obtained cell bandwidths; and
means for signalling a measurement bandwidth to a mobile communications device in dependence upon the determined smallest bandwidth.

19. A base station according to claim 18, wherein said obtaining means is operable to obtain the cell bandwidth of a serving cell associated with the mobile communications device.

20. A base station according to claim 18, wherein said obtaining means comprises means for reading the cell bandwidths from a stored data structure.

21. A base station according to claim 18, further comprising means for receiving measurement reports from the mobile communications device over the determined measurement bandwidth.

22. A base station according to claim 18, further comprising:
means for receiving a cell ID for a new neighbouring cell;
means for establishing a connection with a base station corresponding to the new neighbouring cell; and
means for receiving from the base station cell bandwidth information for the new neighbouring cell.

23. A base station according to claim 22, wherein said means for receiving the cell ID for the new neighbouring cell is operable to receive said cell ID from said mobile communications device.

24. A base station according to claim 22, further comprising a data store for storing the received cell bandwidth information.

25. A mobile communications device, comprising:
means for receiving signalling information from an associated communications device, the signalling information identifying a measurement bandwidth deteimined using at least one of a smallest bandwidth of neighbouring cells and a bandwidth of a cell serving the mobile communications device;
means for detecting neighbouring cells; and
means for performing measurements on the signals from the neighbouring cells over the bandwidth identified by the signalling information.

26. A device according to claim 25, wherein the measurement bandwidth is determined using the smallest bandwidth of neighboring cells and the bandwidth of the cell serving the mobile communication s device.

27. A device according to claim 25, wherein said receiving means is operable to receive said signalling information in a Measurement Control Message.

28. A device according to claim 25, wherein said performing means is operable to perform said measurements between transmitting or receiving data to or from said associated communications device.

29. A device according to claim 25, wherein said detecting means comprises means for receiving signals from the neighbouring cells.

30. A device according to claim 29, further comprising means for notifying the associated communications device of the neighbouring cells from which signals have been received.

31. A device according to claim 30, wherein said means for receiving signalling information is operable to receive said signalling information after said notifying means notifies said associated communications device.

32. A device according claim 25, wherein the means for receiving is operable to receive signalling information that identifies a measurement bandwidth that differs from the bandwidth of the associated communications device, and
wherein the means for performing measurements is operable to perform measurements on the associated communications device over the bandwidth identified by the signalling information.

33. A device according to claim 25, wherein the means for receiving is operable to receive signalling information that identifies a measurement bandwidth that corresponds to a smallest cell bandwidth determined by the associated communications device.

* * * * *